(12) United States Patent
Matsuzawa

(10) Patent No.: US 8,812,677 B2
(45) Date of Patent: Aug. 19, 2014

(54) DATA PROCESSING METHOD AND APPARATUS FOR REMOTE STORAGE SYSTEM

(75) Inventor: Keiichi Matsuzawa, Arlington, MA (US)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 12/974,415

(22) Filed: Dec. 21, 2010

(65) Prior Publication Data

US 2012/0159480 A1 Jun. 21, 2012

(51) Int. Cl.
*G06F 9/455* (2006.01)
*G06F 15/16* (2006.01)

(52) U.S. Cl.
USPC ........... 709/226; 709/201; 709/203; 709/217; 714/15; 718/102; 718/105

(58) Field of Classification Search
USPC .............................. 709/201; 714/15; 718/102
See application file for complete search history.

(56) References Cited

U.S. PATENT DOCUMENTS

| | | | |
|---|---|---|---|
| 6,397,242 B1 | 5/2002 | Devine et al. | |
| 7,330,950 B2 | 2/2008 | Matsunami et al. | |
| 2002/0144019 A1* | 10/2002 | Gooding | 709/330 |
| 2006/0015875 A1* | 1/2006 | Ishihara et al. | 718/102 |
| 2008/0115143 A1* | 5/2008 | Shimizu et al. | 718/105 |
| 2008/0294937 A1* | 11/2008 | Ueda | 714/15 |
| 2009/0007106 A1* | 1/2009 | Araujo et al. | 718/1 |
| 2009/0106008 A1* | 4/2009 | Branson et al. | 703/13 |
| 2010/0153955 A1* | 6/2010 | Sirota et al. | 718/102 |
| 2010/0231959 A1* | 9/2010 | Tanikawa | 358/1.15 |

OTHER PUBLICATIONS

J. White, "A High-Level Framework for Network-Based Resource Sharing", Stanford Research Institute, Menlo Park, California, pp. 1-27, Jan. 14, 1976.
R. Srinivasan, "RPC: Remote Procedure Call Protocol Specification Version 2", Sun Microsystems, pp. 1-18, Aug. 1995.

* cited by examiner

*Primary Examiner* — Joon H Hwang
*Assistant Examiner* — Abdulkader M Alriyashi
(74) *Attorney, Agent, or Firm* — Mattingly & Malur, PC

(57) ABSTRACT

In an information system which includes a local site including a cache file server coupled with a host computer, and a remote site including a remote file server coupled with a surrogate processing computer, a method determines whether each of one or more files of data for a data processing request is cached or not. If yes, the method executes data processing for each cached file to produce results in local site. If no, the method includes creating a file list of files to be processed in remote site; sending the file list and processing program to the surrogate computer; if the processing is sufficiently effective to be done by the surrogate computer, receiving results of the processing executed in remote site, and, if not, then receiving an unprocessed file list from remote site and executing data processing in local site and receiving any results already executed in remote site.

16 Claims, 14 Drawing Sheets

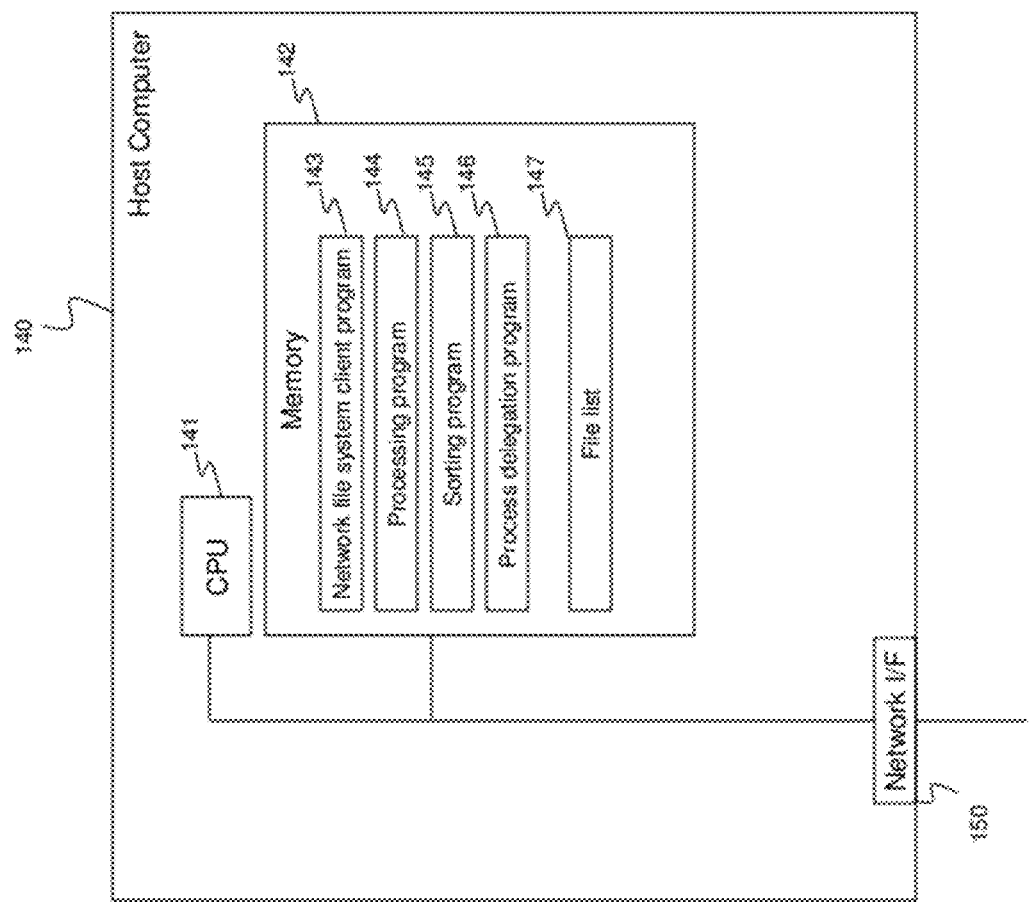

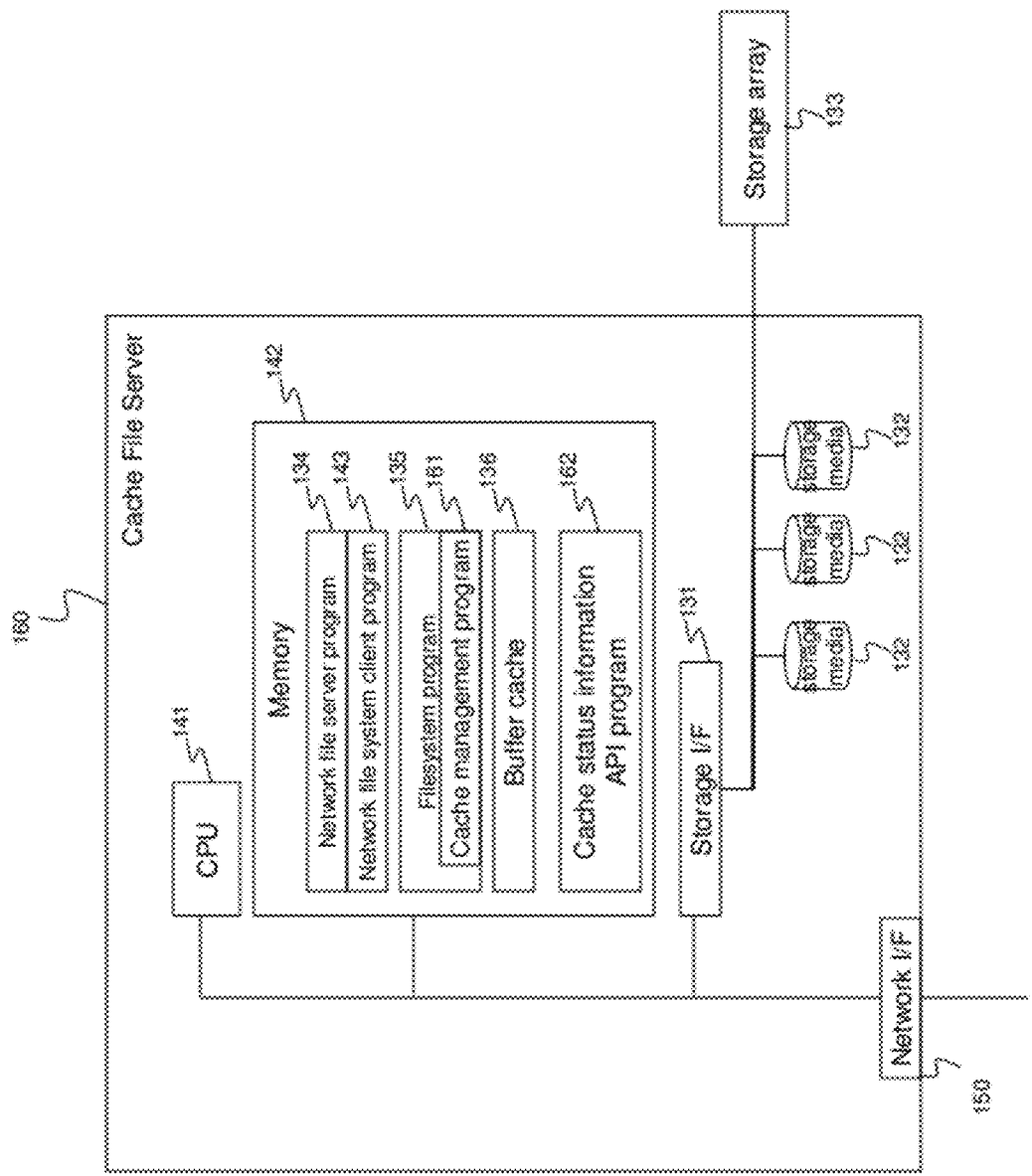

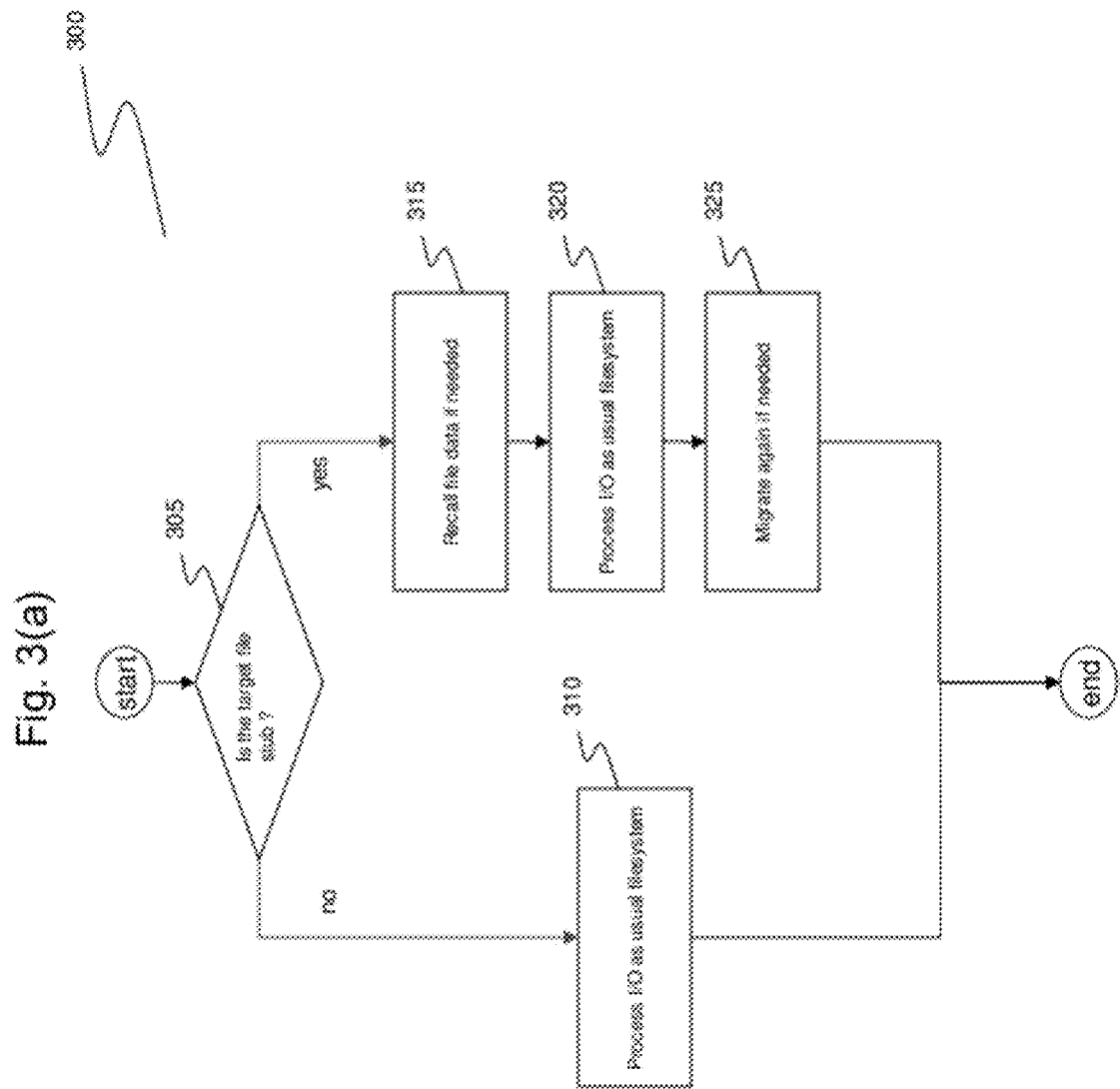

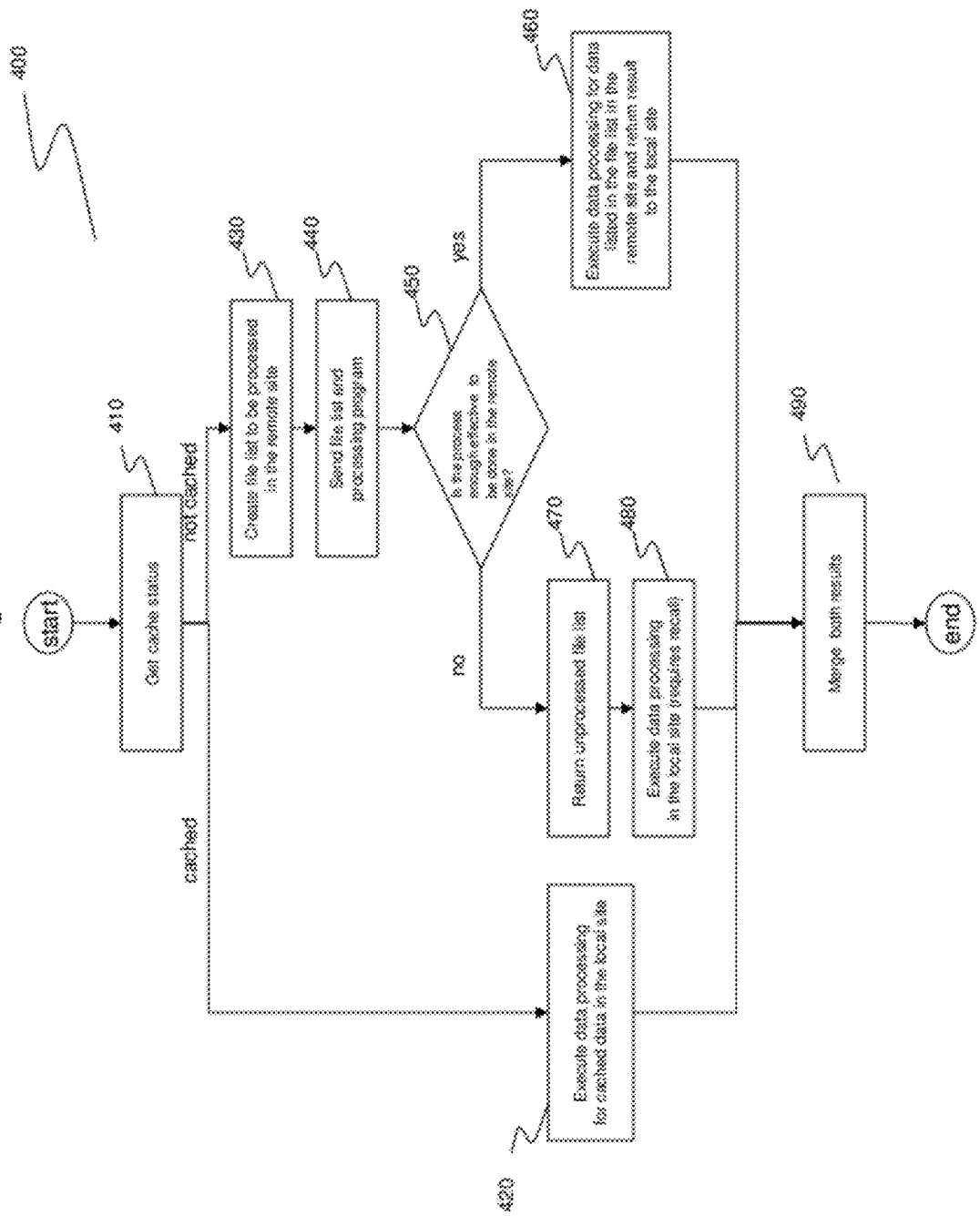

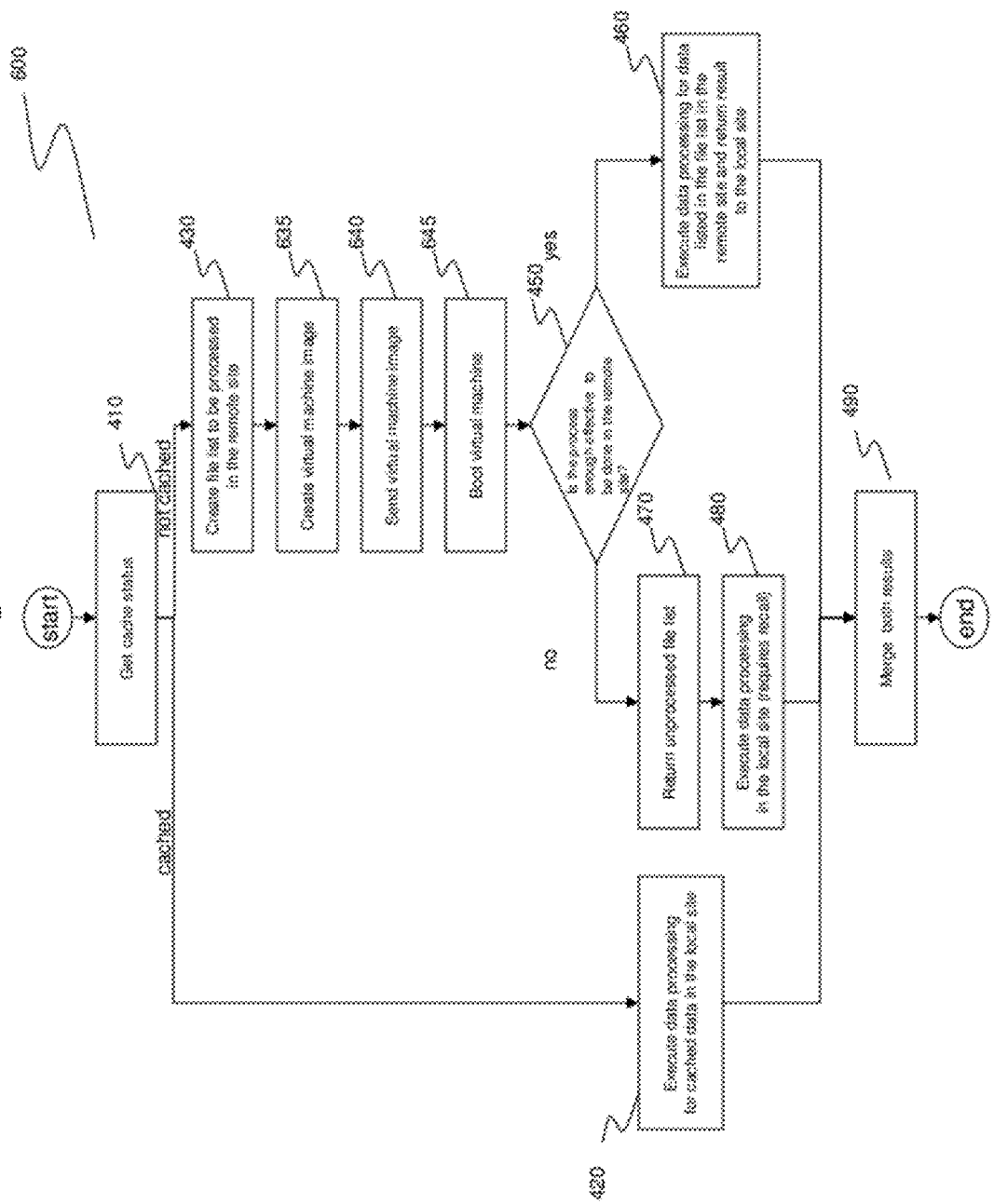

DATA PROCESSING METHOD AND APPARATUS FOR REMOTE STORAGE SYSTEM

BACKGROUND OF THE INVENTION

The present invention relates generally to storage systems and, more particularly, to methods and apparatus for data processing among remote file storage systems.

Data transfers among remote sites are commonly used for various purposes. For example, data sharing among remote offices is used to share documents among users in different places. Data backup and replication to remote site are useful and commonly used methods for DR (Disaster Recovery) and BS (Business Continuity) to avoid damage caused by disasters such as earthquake or power blackout. However, data transfer among remote sites gives rise to problems for data processing. Data transfer for a long distance results in high latency and low bandwidth. When a computer in a local site executes a data processing program requiring whole data (such as text search or virus scan) stored in a remote site and the local site has no cache data, the computer must recall whole data from the remote site and this results in significant processing time.

BRIEF SUMMARY OF THE INVENTION

Exemplary embodiments of the invention provide methods and apparatus to lessen data processing time for data in remote sites for file storage systems. In specific embodiments, a local site has a file server behaving as cache of the remote file server. This local file server provides interface to get the caching status of each file. A local computer in the local site which processes data inquires whether target files are cached or not. This local computer processes cached files locally and this process ends fast because it does not require long distant data transfer. The local computer sends the processing program and file list not processed locally to a remote processing computer in the remote site. The remote processing computer processes the sent program and returns results to the local computer. The remote processing computer is close to the remote file sever and does not require long distance data transfer. The contents transferred between the local and remote sites are the processing program, the file list, and processed results. These contents are generally smaller than the file data. Thus the use of the local computer can result in less processing time. This invention takes into account the cache status of each file and uses limited and expensive network bandwidth effectively.

An aspect of the present invention is directed to a method for data processing in an information system which includes a local site disposed remotely from a remote site, the local site including a cache file server coupled with a host computer, the remote site including a remote file server coupled with a surrogate processing computer. The method comprises: determining whether each of one or more files of data for a data processing request is cached or not, and if yes, executing data processing for each cached file to produce results in the local site, and if no, then, creating a file list of files, which are not cached, to be processed in the remote site; sending the file list and a processing program for the data processing to the surrogate processing computer in the remote site; if the data processing is sufficiently effective to be done by the surrogate processing computer in the remote site, then receiving results of the data processing for data in the file list executed in the remote site; and, if the data processing is not sufficiently effective to be done by the surrogate processing computer in the remote site, then receiving an unprocessed file list of unprocessed data from the remote site and executing data processing of the unprocessed file list in the local site and receiving any results of the data processing for data in the file list already executed in the remote site.

In some embodiments, the method further comprises merging the results of data processing performed in the local site with the results of data processing performed in the remote site and received from the remote site. The surrogate processing computer includes a virtual machine monitor program emulating a virtual computer, and the method further comprises creating a virtual machine image which includes the processing program and the file list of files to be processed in the remote site; and sending the virtual machine image including the file list and the processing program to the surrogate processing computer in the remote site. The method further comprises executing the virtual machine monitor program to boot a virtual machine in the surrogate processing computer to perform data processing of data in the file list in the remote site. The virtual machine image is sent at a first time for a first data processing in the remote site, and the method further comprises sending a differential part of the virtual machine image to the surrogate processing computer in the remote site, at a second time subsequent to the first time, for a second data processing in the remote site.

In specific embodiments, the method further comprises determining if the data processing is sufficiently effective to be done by the surrogate processing computer in the remote site, which includes: executing the data processing for a portion of the data in the file list by the surrogate processing computer in the remote site; measuring a remote processing time for data processing of the portion of the data in the file list in the remote site; and judging whether it is faster to process a remaining portion of the data in the file list in the remote site than to process the remaining portion of the data in the file list in the local site based on local processing time for processing former data by the host computer in the local site, and if yes, then the data processing is sufficiently effective to be done by the surrogate processing computer in the remote site.

In accordance with another aspect of the invention, an information system comprises a local site which includes a cache file server coupled with a host computer; and a remote site which is disposed remotely from and coupled with the local site, and which includes a remote file server coupled with a surrogate processing computer. For each file of one or more files of data for a data processing request which is cached, the host computer executes data processing for each cached file to produce results in the local site. For each file of one or more files of data for the data processing request which is not cached, the host computer creates a file list of files, which are not cached, to be processed in the remote site, and sends the file list and a processing program for the data processing to the surrogate processing computer in the remote site. If the data processing is sufficiently effective to be done by the surrogate processing computer in the remote site, then the host computer receives results of the data processing for data in the file list executed in the remote site. If the data processing is not sufficiently effective to be done by the surrogate processing computer in the remote site, then the host computer receives an unprocessed file list of unprocessed data from the remote site and executing data processing of the unprocessed file list in the local site and receives any results of the data processing for data in the file list already executed in the remote site.

In some embodiments, the host computer includes a process delegation module configured to merge the results of data processing performed in the local site with the results of data processing performed in the remote site and received from the remote site. The surrogate processing computer is configured to determine whether the data processing is sufficiently effective to be done by the surrogate processing computer in the remote site, and if yes, the surrogate processing computer executes the data processing for data in the file list and returns results of the data processing to the host computer, and if no, the surrogate processing computer returns the unprocessed file list of unprocessed data to the host computer for data processing of the unprocessed file list in the local site and returns any results of the data processing for data in the file list already executed in the remote site. The surrogate processing computer includes a virtual machine monitor program emulating a virtual computer; and the host computer creates a virtual machine image which includes the processing program and the file list of files to be processed in the remote site, and sends the virtual machine image including the file list and the processing program to the surrogate processing computer in the remote site.

In specific embodiments, the surrogate processing computer executes the virtual machine monitoring program to boot a virtual machine in the surrogate processing computer to perform data processing of data in the file list in the remote site. The host computers sends the virtual machine image to the surrogate processing computer at a first time for a first data processing in the remote site, and sends a differential part of the virtual machine image to the surrogate processing computer, at a second time subsequent to the first time, for a second data processing in the remote site. The virtual machine image includes a surrogate program; and the surrogate processing computer runs the surrogate program to execute the received processing program for data processing of data in the file list in the remote site.

Another aspect of this invention is directed to a host computer in an information system which includes a local site having a cache file server coupled with a host computer; and a remote site which is disposed remotely from and coupled with the local site, and which includes a remote file server coupled with a surrogate processing computer. The host computer comprises a processor; a memory; a processing module; a sorting module; and a process delegation module. For each file of one or more files of data for a data processing request which is cached, the processing module is configured to execute data processing for each cached file to produce results in the local site. For each file of one or more files of data for the data processing request which is not cached, the sorting module is configured to create a file list of files, which are not cached, to be processed in the remote site, and the process delegation module is configured to send the file list and a processing program for the data processing to the surrogate processing computer in the remote site. If the data processing is sufficiently effective to be done by the surrogate processing computer in the remote site, then the process delegation module is configured to receive results of the data processing for data in the file list executed in the remote site. If the data processing is not sufficiently effective to be done by the surrogate processing computer in the remote site, then the process delegation module is configured to receive an unprocessed file list of unprocessed data from the remote site and executing data processing of the unprocessed file list in the local site and receive any results of the data processing for data in the file list already executed in the remote site.

In some embodiments, the process delegation module is configured to merge the results of data processing performed in the local site with the results of data processing performed in the remote site and received from the remote site. The process delegation program is configured to create a virtual machine image which includes the processing program and the file list of files to be processed in the remote site, and send the virtual machine image including the file list and the processing program to the surrogate processing computer in the remote site. The process delegation program is configured to send the virtual machine image to the surrogate processing computer at a first time for a first data processing in the remote site, and send a differential part of the virtual machine image to the surrogate processing computer, at a second time subsequent to the first time, for a second data processing in the remote site. The virtual machine image includes a surrogate program which is to be run by the surrogate processing computer to execute the received processing program for data processing of data in the file list in the remote site.

These and other features and advantages of the present invention will become apparent to those of ordinary skill in the art in view of the following detailed description of the specific embodiments.

BRIEF DESCRIPTION OF THE DRAWINGS

FIGS. 1(a)-(e) show an example of the information system overview in which the method and apparatus of the invention may be applied according to the first embodiment.

FIG. 3(a) illustrates an example of a process flow that the filesystem program and cache management program perform when the cache file server receives a file I/O request.

FIG. 4 illustrates an example of the data processing flow according to the first embodiment.

FIG. 6 illustrates an example of the data processing flow according to the second embodiment.

DETAILED DESCRIPTION OF THE INVENTION

Figure 1A:
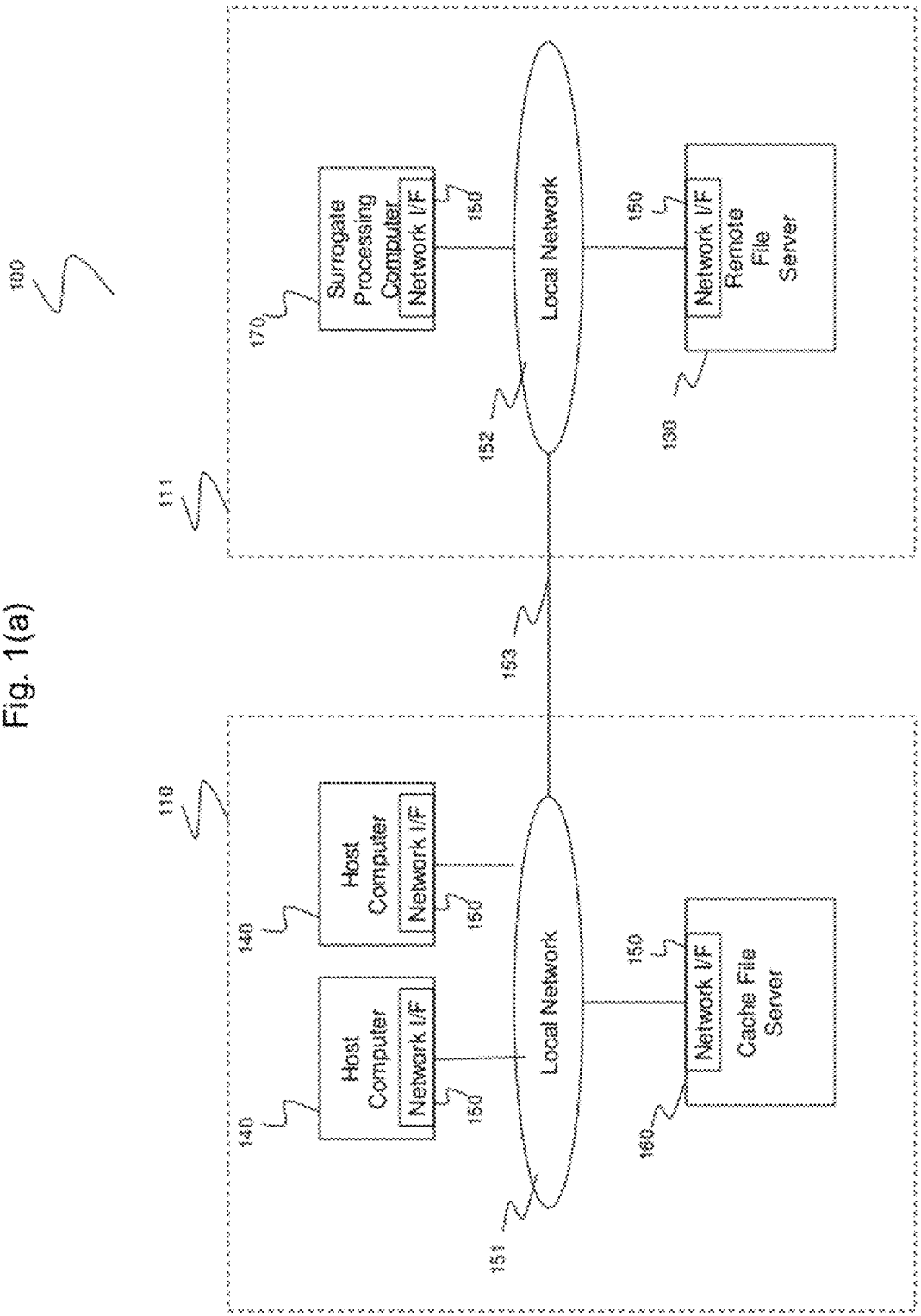

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for data processing among remote file storage systems.

First Embodiment

A. System Configuration

FIGS. 1(a)-(e) show an example of the information system overview 100 in which the method and apparatus of the invention may be applied according to the first embodiment. As seen in FIG. 1(a), the information system 100 includes a local site 110 and a remote site 111. The local site 110 is a site where the users physically use and the users want to process data. The local site 110 includes one or more host computers 140, a cache file server 160, and a local network 151 connecting them. The remote site 111 is a site physically located in a remote place where user data is stored. The remote site 11 includes one or more surrogate processing computers 170, a remote file server 130, and a local network 152 connecting them. The local site 110 and the remote site 111 are connected via an inter-site network 153.

The various computers (host computers 140, remote file server 130, cache file server 160, and surrogate processing computer 170) each have a CPU (Central Processing Unit) 141, a memory 142, and a network interface 150. The CPU 141 controls the devices in computers as programs in the memory 142. The memory 142 stores many kinds of data including, for example, programs or buffer cache. The network interface 150 is used to communicate with other computers via the networks 151 and 152.

As seen in FIG. 1(b), the host computer 140 is one that users of the information system 100 use to process data for their business. The host computer 140 has programs 143, 144, 145, and 146 and a list 147 in its memory 142. The network file system client program 143 is executed by the CPU 141 to issue a file I/O request to the cache file server 160 via the network interface 150, and enables the host computer 140 to access files in the cache file server 160. The processing program 144 is a program that describes what users want to do such as, for example, text search, virus scan, and editing document. The sorting program 145 is executed by the CPU 141 to communicate with the cache status information API program 162 in the cache file server 160 and judge if the target data is processed in the local site 110 or the remote site 111. The process delegation program 146 is executed by the CPU 141 to send the processing program 144 and file list 147 to the surrogate processing computer 170 in the remote site 111 and receive the result from the surrogate processing computer 170. The file list 147 is a list of files to be processed in the remote site 111.

Figure 1C:
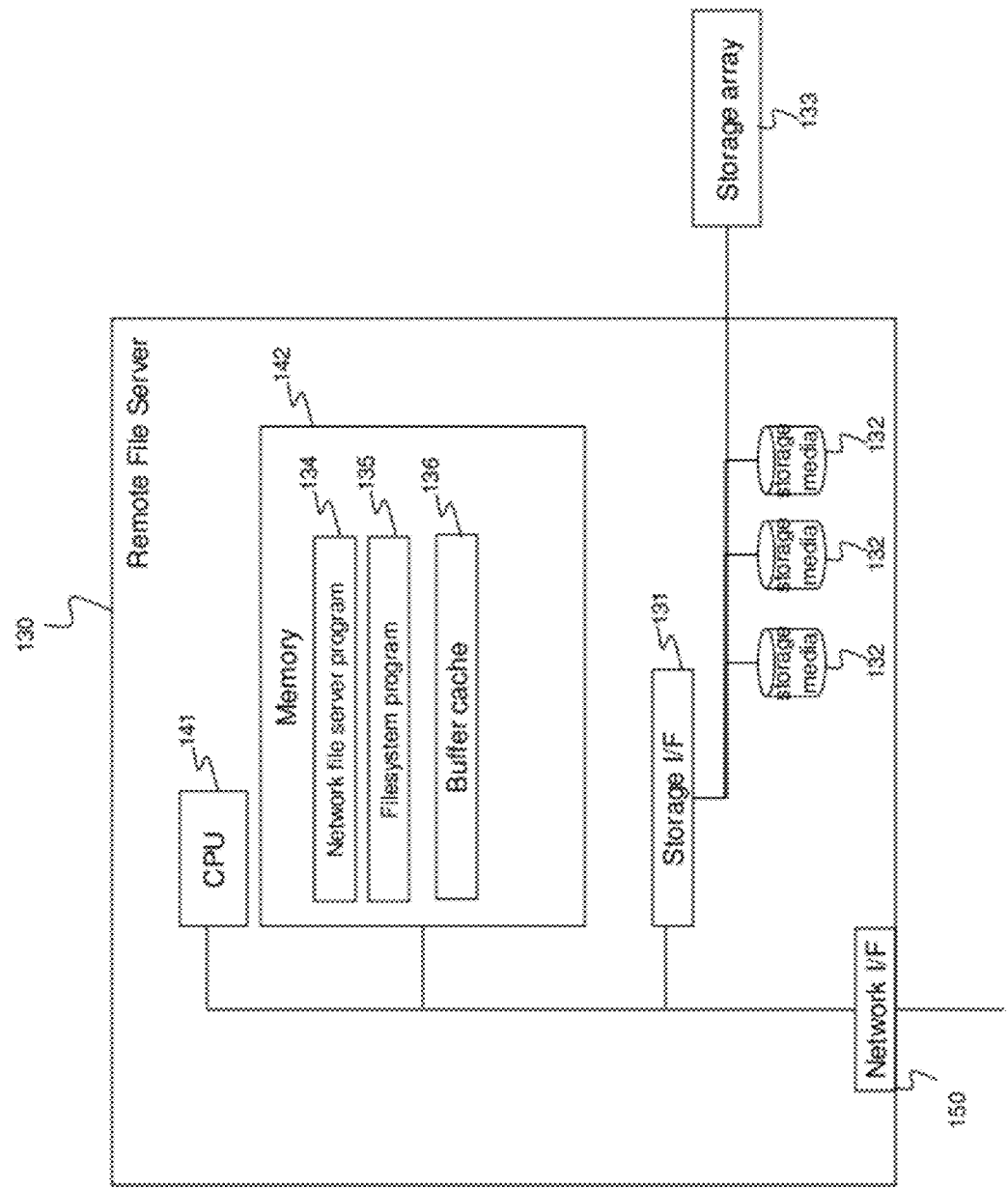

As seen in FIG. 1(c), the remote file server 130 in the remote site 111 stores the users' file data. The CPU 141 receives file I/O requests from external computers and returns the result via the network interface 150 by referring to the network file processing program 134. The CPU 141 processes file I/O requests and reads/writes data from/onto the storage media 132 or storage array 133 connected via the storage interface 131 by referring to the file system program 135. FC (Fibre Channel), SATA (Serial Attached Technology Attachment), SAS (Serial attached SCSI), IDE (Integrated Device Electronics), or other interfaces are used for communication between the CPU 141 and the storage interface 131. The remote file server 130 can have many kinds of storage media 132 such as HDD (Hard Disk Drive), SSD (Solid State Drive), flush memories, optical disks, magnetic tapes, and the like. Their array by RAID (Redundant Array of Independent Disk) technology is also available for the storage media 132. Furthermore, the external storage array 133 can be used instead of the internal storage media 132. The CPU 141 can use the memory 142 for other usage such as the buffer cache 136. This buffer cache 136 stores the cache data of the storage media 132 to achieve fast data access by reducing I/O requests to the storage media 132.

As seen in FIG. 1(d), the cache file server 160 is in the local site 110 and its structure is similar to the remote file server 130. The cache file server 160 has some additional programs 143, 161 and 162 as compared to the remote file server 130.

The network file system client program 143 is the same as the system client program 143 of the host computer 140. The cache file server 160 uses this program 143 to issue file I/O requests to the remote file server 130. The cache management program 161 enables the cache file server 160 to behave as cache for the remote file server 130. By using the cache management program 161, the host computers 140 can access data in the remote file server 130 transparently, which means that the host computers 140 have only to issue file I/O requests to the cache file server 160 and do not need to be aware of the remote file server 130. The cache status information API (Application Program Interface) program 162 enables the host computers 140 to get the status of cache.

Figure 1E:
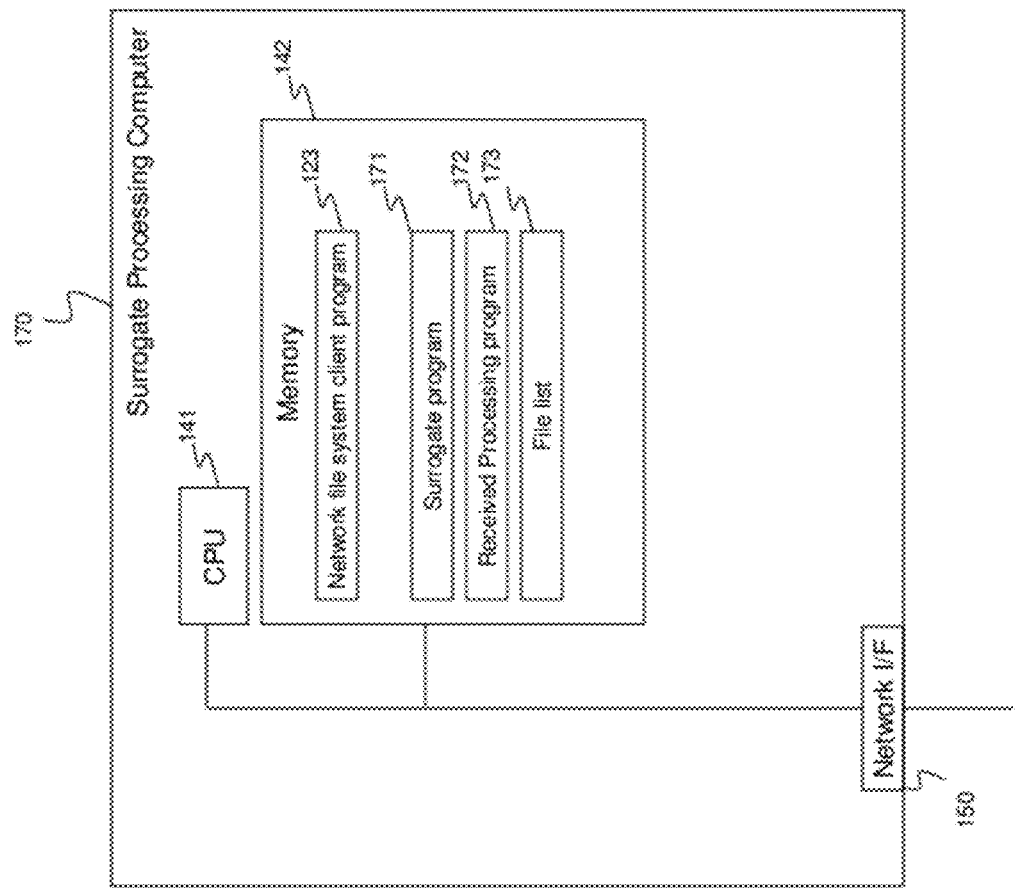

As seen in FIG. 1(e), the surrogate processing computer 170 is in the remote site 111 and responsible about data processing in the remote site 111. This surrogate computer 170 is what processes data as substitute for the host computers 140 in the local site 110. The network file system client program 123 is used to issue file I/O requests to the remote file server 130. The surrogate program 171 is executed by the CPU 141 to communicate with the process delegation program 146 and receive delegation requests including a received processing program 172 and a file list 173. The received processing program 172 is sent by the host computer 140 to be run in the remote site. The file list 173 is sent by the host computer 140 and enumerates target files to be processed in the remote site.

For the local networks 151, 152, the computers in the same site communicate with each other, issue I/O requests, and issue data processing requests via the local network 151 and 152 by using the network interface 150. The local networks 151 and 152 are also connected bilaterally so that computers in different sites can communicate with each other. There are some common protocols for file I/O requests interface via network such as NFS (Network File System), CIFS (Common Internet File System), and AFP (Apple Filing Protocol).

B. File-Level Hierarchical Storage Management

This embodiment shows one example of a per-file cache management method by using file-level HSM (Hierarchical Storage Management) but this invention is not limited to the file-level HSM based method. Other per-file cache management method is available for this embodiment.

Generally, HSM is a technique to use a plurality of storage media with different characteristics. A storage system capable of HSM manages data location automatically so that the users do not need to be aware which storage media on which each data is stored. By using HSM, the users can locate data that is accessed frequently on fast but expensive storage media and data that is not accessed frequently on slow but inexpensive media. Thus, the users can reduce the total cost for storage media but obtain reasonable performance.

File-level HSM is a type of HSM. The file-level HSM technique distributes data onto different storage media on a per-file basis. Some implementations of file-level HSM can locate file data onto some other external file storage system. This characteristic can be used to implement per-file cache management.

This embodiment focuses on the last kind of file-level HSM, which locates file data onto some other external file storage system. We assume in this embodiment that the cache management program 161 uses such a file-level HSM functionality.

Figure 2A:
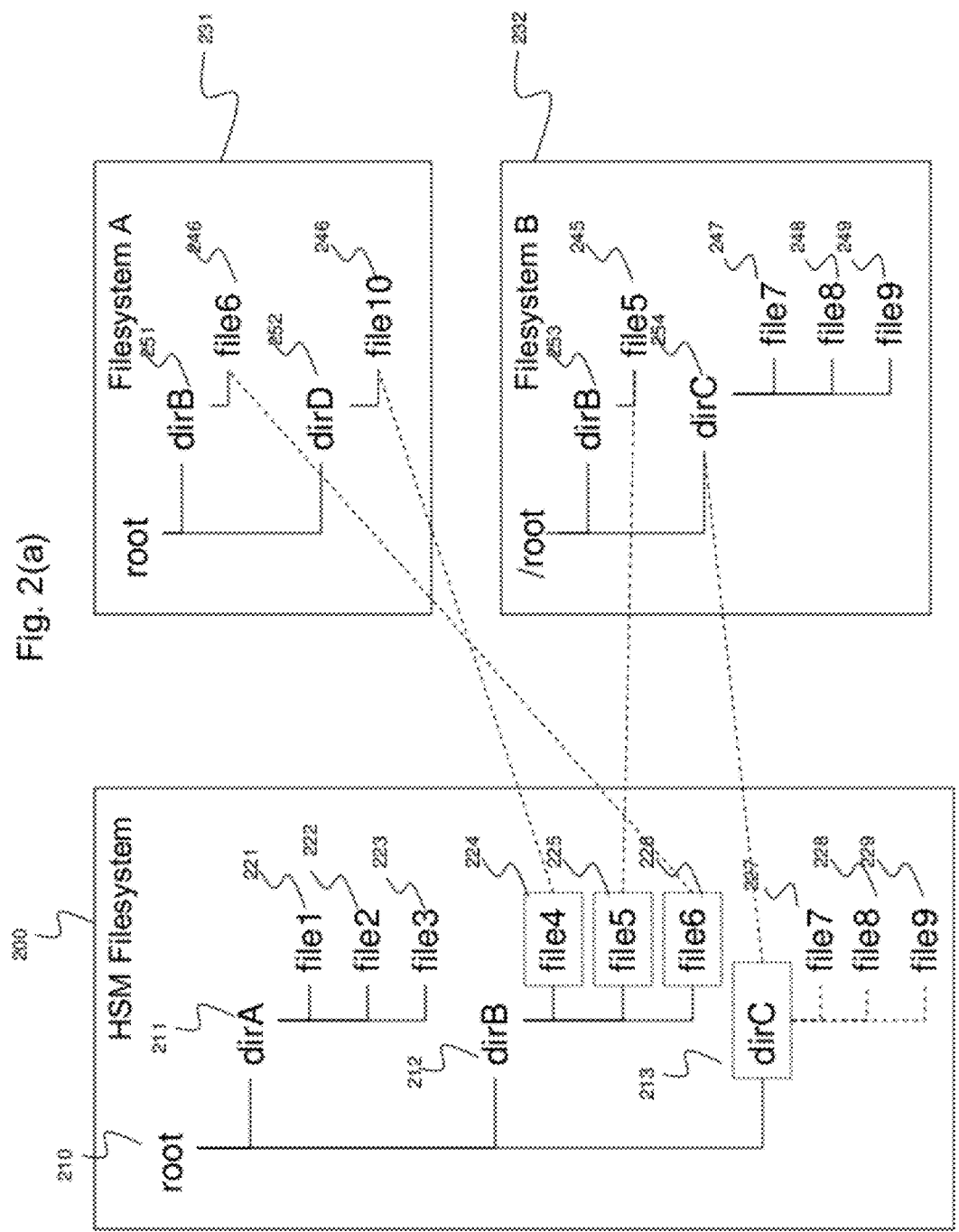
FIGS. 2(a) and 2(b) show an example of implementation of file-level HSM (Hierarchical Storage Management) using the stub file technique.
Figure 2B:
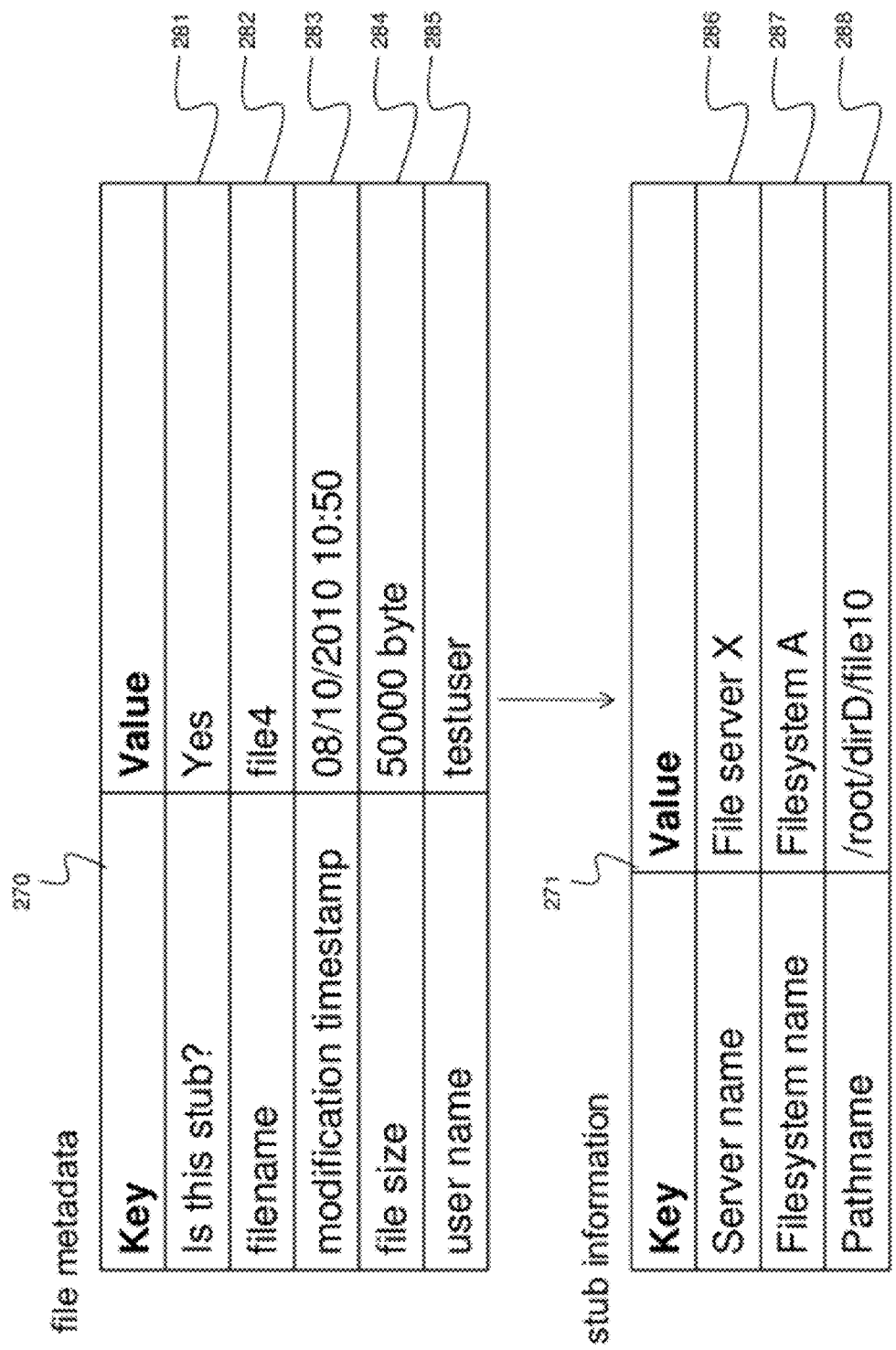

FIGS. 2(a) and 2(b) show an example of implementation of file-level HSM using the stub file technique. A "stub file" is a virtual file which does not have data of the file basically but indicates the location of the data stored on external file servers. A stub file may have a part of data or the whole data as cache. The file tree of the HSM filesystem 200 illustrates the file hierarchy of the HSM file system which the HSM file server 130 shows to the clients. The file tree 200 has root 210 and subdirectories 211, 212 and 213 and each directory has some files such as file 221, 222, 223 or 227. Each path location is indicated by the path name which is connection of each directory name and file with slashes. For example, the path name of file 221 is "/root/dirA/file1." The HSM filesystem itself can be used as a normal filesystem. The files 221, 222 and 223 are normal files so that the clients can read or write by specifying the path name such as "/root/dirA/file1," "/root/dirA/file2," and "/root/dirA/file3." The files 224, 225 and 226 are examples of the HSM feature. The HSM filesystem 200 stores some part of the data of such files in their internal storage media 132. For example, the HSM filesystem 200 stores only file name and metadata, such as file creation time or access control information, but not their data. Instead of having the entire data of files, the HSM filesystem stores information about the location of file data.

FIG. 2(b) illustrates an example structure of such a stub file 224. File metadata 270 stores metadata of each file. The file metadata 270 has an entry 281 showing whether the file is stub or not (normal file). If the file is stub, the file metadata 270 has corresponding stub information 271. If the file is not stub, the file metadata 270 must be filled to serve enough information 283, 284, and 285 for the filesystem users. If the file is stub, only the entry 281 and filename 282 are needed to specify the path name and the state that the file is stub or not. The other entries 283, 284 and 285 of the stub file can be stored or not because the filesystem program 124 can get such metadata by referring to the corresponding stub information 271 and external file servers. The stub information 271 shows the actual location of the file data. In this example, the stub information 271 indicates the location by specifying the external server name 286, filesystem name 287 in the external file server, and path name 288 on the filesystem. The actual file does not have to have the same path name as that of the HSM filesystem. For example, the stub file 224 has the path name "/root/dirB/file4" but the actual file 246, which is stored in filesystem A 231, is referred to as "/root/dirD/file10." The file metadata 270 can have plural pieces of stub information 271 per a part of file data. This enables the distribution of file data among file servers and storage of only some part of the data onto the external file servers. Even if the file is stub, the HSM file server 130 can keep a part of the file data or whole data as cache in the internal storage media 132 to reduce communication with the external file servers for faster response.

The cache file server 160 can convert the file to the stub and vice versa by "recall" and "migration." The "recall" is a process to read actual file data from the external file server that the stub information specified. After reading whole data, the cache file server 160 can replace the stub with the whole file. The "migration" is an opposite process to copy the file data to an external file server, make stub information, and convert the file to stub via the backend network 152.

A directory 213 "/root/dirC" can be handled as stub files. In this situation, the HSM filesystem 200 may have no information about the files 227, 228, and 229 underneath. When the clients access files underneath the directory 213, the HSM filesystem 200 acts to have files 227, 228 an 229 actually stored in a directory 254, which is in filesystem B 232 because the directory 254 has such three files 247, 248 and 249.

Figure 3B:
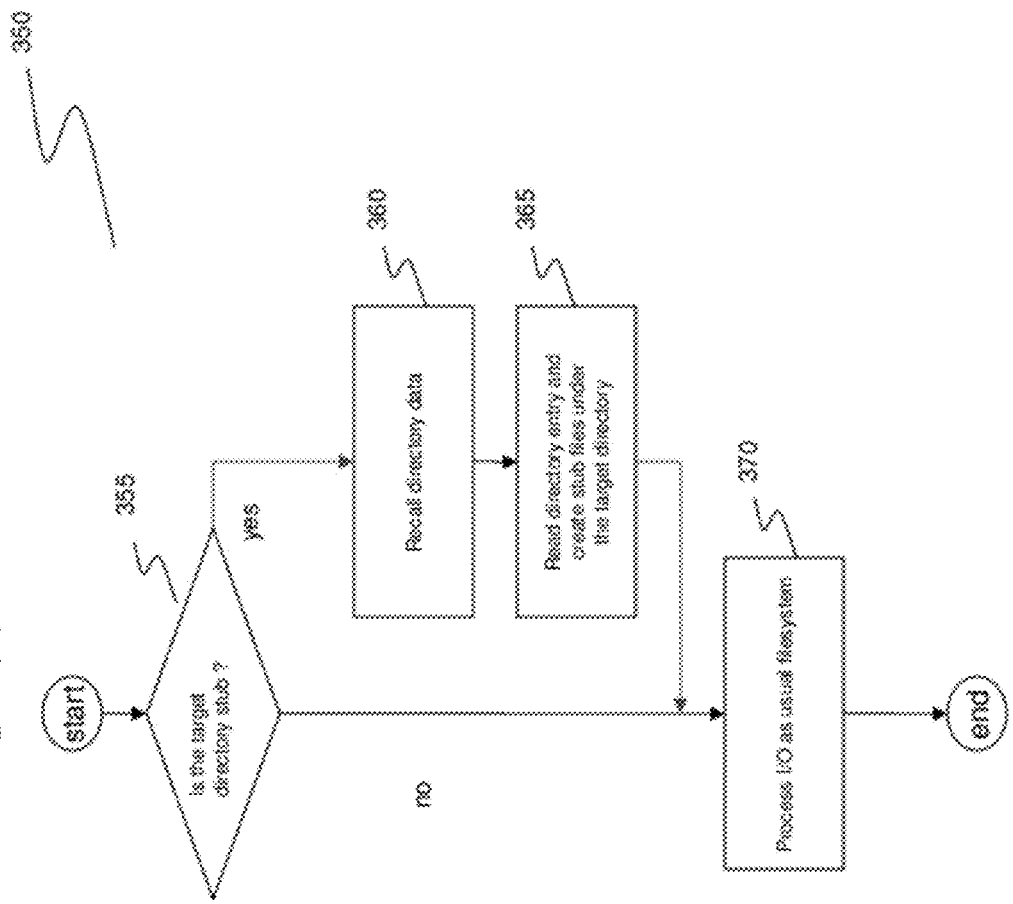
FIG. 3(b) illustrates an example of a process flow that the file system program and cache management program perform when the cache file server receives an I/O request for directories.

FIG. 3(a) illustrates an example of a process flow 300 that the filesystem program 135 and cache management program 161 perform when the cache file server 160 receives a file I/O request. First, the cache file server 160 looks up information to ascertain whether the requested file is stub or not (step 305). If the file is not stub, the cache file server 160 processes the request as a normal file server (step 310). If the file is stub, the cache file server 160 recalls the file data from the external file server, if needed (step 315). If the clients request "read" I/O, the cache file server 160 has to recall data because the cache file server 160 has no actual data. When the clients overwrite an existing file, the cache file server 160 does not have to recall data because the clients send the data. "Do recall or not" depends on the operation type (read or write), data range, and users policy. After the recall, the cache file server 160 processes the I/O request as usual (step 320). Finally, the cache file server 160 may migrate the file to the external server again (step 325).

FIG. 3(*b*) illustrates an example of a process flow 350 that the file system program 135 and cache management program 161 perform when the cache file server 160 receives an I/O request for directories. First, the cache file server 160 looks up to ascertain whether the requested directory is stub or not (step 355). If the directory is stub, the cache file server 160 recalls the directory entry data from the external file server (step 360). After that, the cache management program 161 creates stub for files under the directory by reading directory entry and metadata in the external file server if needed (step 365). By step 360 and step 365, the cache management program 161 has information about files under the directory and the clients can look up these files. Now the directory is not stub so that the cache management program 161 processes the request as a normal filesystem (step 370). When the clients issue I/O requests for files whose parent directories are stub, the cache management program 161 recalls such parent directories as the flow 350 to access the target file.

By these I/O flows 300 and 350, the cache file server 160 hides external file servers for the clients so that the clients can access files among the external file servers by just accessing a single cache file server 160.

C. Data Processing by Using Cache Information and Process Delegation

FIG. 4 illustrates an example of the data processing flow 400 according to the first embodiment. When the users of the information system 100 cause the host computers 140 to start data processing, components in the information system 100 execute this flow 400.

First, the sorting program 145 of the host computers 140 communicates with the cache management program 161 of the cache file server 160 and receives status indicating whether each of the target files is cached or not (step 410). Assuming the cache management program 161 uses file-level HSM for cache management as mentioned above, the cache management program can determine that a file is cached when the file is not stub and that a file is not cached when the file is stub. The processing program 144 of the host computer 140 executes data processing of the users' purpose toward files cached in the cache file server 160 (step 420).

Concurrently or subsequently, the sorting program 145 creates the file list 147 listing file names that are not cached and to be processed in the remote site to prevent long distance transfer of data (step 430). The process delegation program 146 of the host computers 140 sends the processing program 144 and file list 147 to the surrogate processing computer 170 in the remote site 111 (step 440). The surrogate program 171 of the surrogate processing computer 170 receives data from the process delegation program 146 and stores the data as a received processing program 172 and a file list 173 in its memory 142. The surrogate program 171 judges if data processing in the remote site 111 is effective or not (step 450). Some kinds of data processing take more time to do in the remote site 111 than in the local site 110. For example, the CPU 141 of the surrogate processing computer 170 is slower than that of the host computer 140. In another example, data comparison between data in the local site 110 and data in the remote site 111 requires either data transfer from the local site 110 to the remote site 111 or the opposite data transfer. Both data transfers take much time so that it is not effective for processing in the remote site 111.

If the answer to the inquiry in step 450 is yes, the surrogate program 171 executes the received processing program 172 for data processing (step 460). The received processing program 172 processes data listed in the file list 173 and stored in the remote file server 130. This process requires data transfer via the local network 152 but does not require transfer via the inter-site network 153. Thus, this process does not take much time for long distant transfer. If the surrogate program 171 judges no at step 450, the surrogate program 171 returns file list enumerating unprocessed data in the remote site 111 (step 470). The processing program 144 of the host computer 140 in the local site 110 executes data processing for unprocessed data (step 480). Steps 420, 450, 460, 470 and 480 can be done in parallel per file. Furthermore, the surrogate program 171 can use information of the results of processing former data at steps 450 and 480. For example, after the surrogate program 171 processed 10% of listed files, the surrogate program 171 measures time processing 10% of data and judges if it is faster to process the remaining 90% in the remote site 111 or not. After these steps, the process delegation program 146 merges the results of steps 420, 460, and 480 (step 490). The merged result is definitive.

This embodiment reduces the transfer of file data to be processed between sites but requires additional transfer of the processing program 144, file list 147, and processed result. Generally, the result of data processing is smaller in size than the data itself such as text search and virus scan. Thus, this embodiment can accomplish reduction of data transfer between the local site and the remote site and reduce overall processing time.

Second Embodiment

The first embodiment requires that the surrogating processing computer 170 execute the same program of the host computers 140. This requirement cannot be fulfilled if they use different CPU architectures, different operating systems, or different libraries. The second embodiment satisfies this requirement by using virtual machine technology.

Figure 5A:
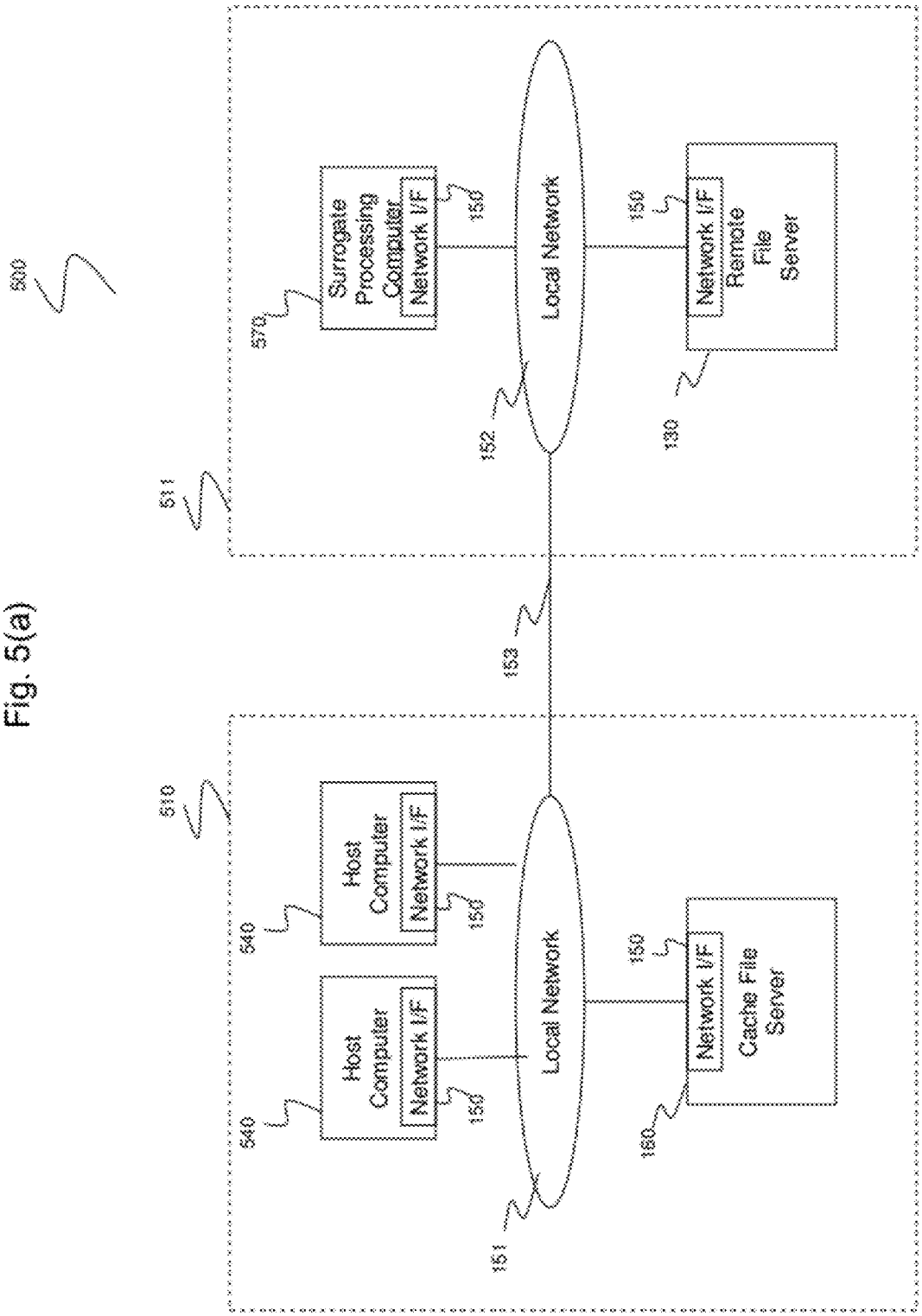
FIGS. 5(a)-5(c) illustrate an example of the information system according to the second embodiment.
Figure 5B:
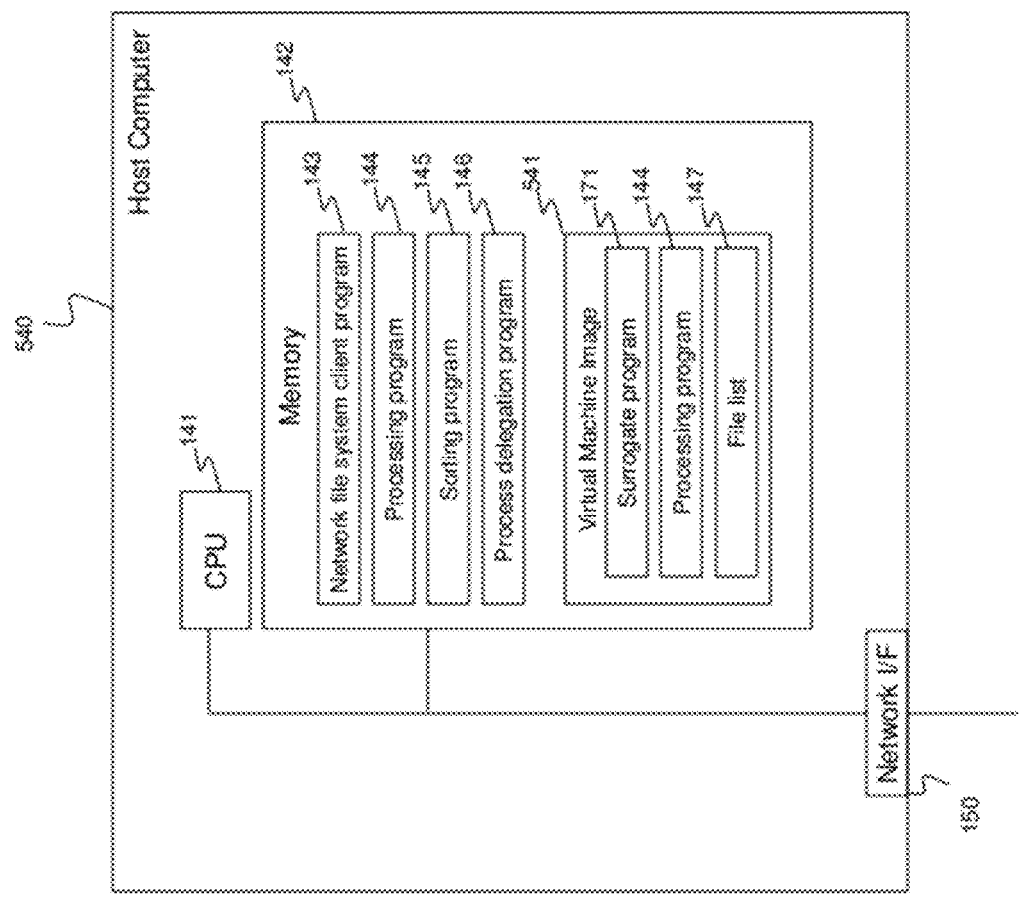
Figure 5C:
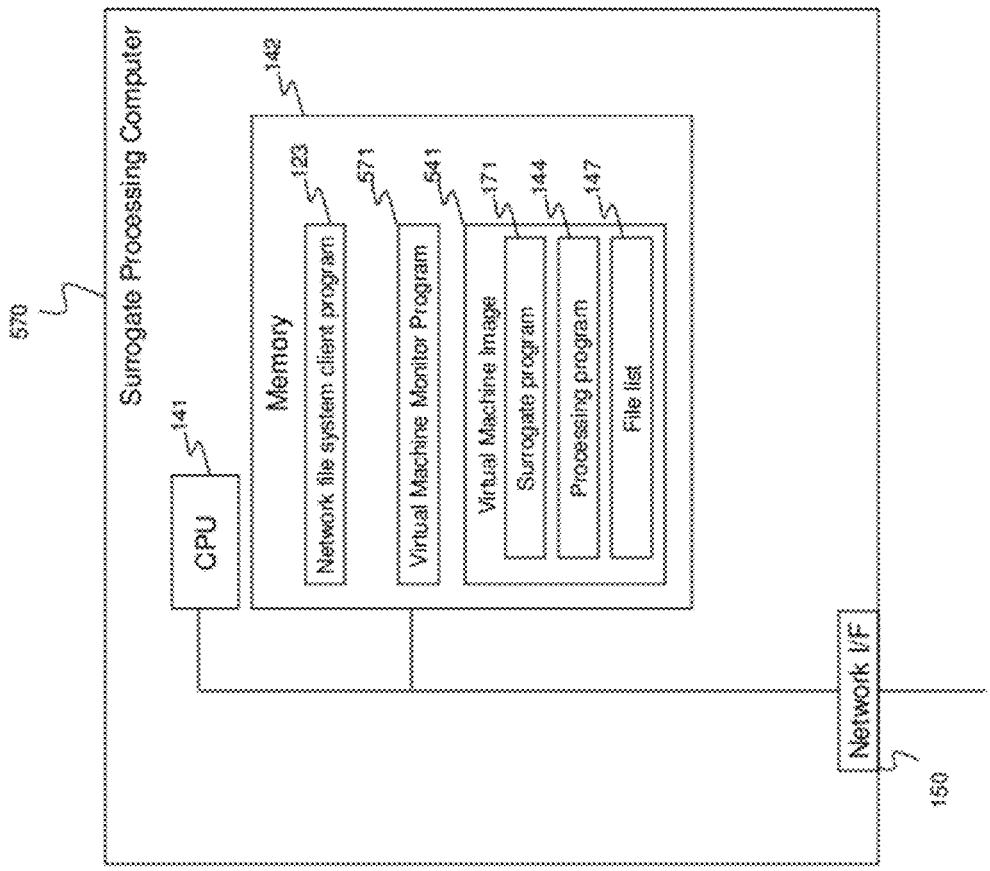

FIGS. 5(*a*)-5(*c*) illustrate an example of the information system 500 according to the second embodiment, which is similar to the system 100 of FIG. 1 except the host computers 540 and surrogating computer 570 are different. The host computer 540 is similar to the host computer 140 of FIG. 1, but it has a virtual machine image 541 including the surrogate program 171, processing program 144, and file list 147 (FIG. 5(*b*)). The surrogating computer 570 is similar to the surrogating computer 140 of FIG. 1, but it has a virtual machine image 541 and a virtual machine monitor program 571 (FIG. 5(*c*)).

A. Virtual Machine Monitor

Virtual machine (VM) technology is widely used in recent computing systems. This technique emulates virtual computers that sometimes have different types of CPU, memory, and other components. By this technology, users of the information system can execute different kinds of operating system and programs in different computers. U.S. Pat. No. 7,117,499 discloses an example of such a technique, and is incorporated herein by reference in its entirety. The virtual machine monitor (VMM) 571 is such a program emulating virtual computers. The VMM 571 accesses the virtual machine image 541 in the memory 142 and executes the operating system and programs stored in the virtual machine image 541 on the emulated virtual computer.

There are many known implementations of VMM. An example VMM virtualizes hardware and VMs on the VMM behave as if they were on real hardwares, which are virtualized actually, and execute their OS and applications thereon. However, when the VMs access some kind of hardware resources such as special register on CPU, page table on memory, ACPI (Advanced Configuration and Power Interface) information, and mapped memory area for PCI (Peripheral Component Interface) or when the VMs cause interruption, the VMM traps the accesses, emulates the behavior, and responds as real hardware would do. This action hides real hardware configurations from the VMs and enables the VMs to run their own OS and applications on virtualization hardware.

B. Data Processing by Using Cache Information and Process Delegation

FIG. 6 illustrates an example of the data processing flow 600 according to the second embodiment. When users of the information system 500 cause the host computers 540 to start data processing, components in the information system 500 execute this flow 500.

This flow 600 is almost the same as the flow 400 of FIG. 4 but includes different processing steps between steps 430 and 450. After step 430 in FIG. 6, the process delegation program 146 of the host computer 540 generates the VMI 541 including the file list 147 listed at step 430 and the processing program 144 (step 635). This VMI 541 includes the same processing environment as the host computers 540 in terms of CPU architecture, operating system, and libraries. Next, the process delegation program 146 sends the VMI 541 to the surrogate processing computer 570 via the inter-site network 153 (step 640). The VMI 541 is sometimes large because it includes a large amount of data for operating system and libraries. Assuming that users process data repeatedly, it is a useful way to reduce data transfer whereby the host computer 540 sends the entire VMI 541 at a first time and sends a differential part of the VMI 541 at a second time. The VMM program 571 of the surrogate processing computer 570 boots the virtual machine from the VMI 571 (step 645). The VM executes steps 450, 460, and 470 in FIG. 6 as the surrogate program 171 does in the flow 400 of FIG. 4.

This embodiment enables the system to process data in shorter time than to process the entire data in the local site 510 even if the surrogate processing computer 570 has different CPU architecture, operating system or libraries from those of the host computers 540.

Of course, the system configurations illustrated in FIGS. 1 and 5 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media to lessen data processing time for data in remote sites for file storage systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method for data processing in an information system which includes a local site disposed remotely from a remote site, the local site including a cache file server coupled with a host computer, the remote site including a remote file server coupled with a surrogate processing computer, the method comprising:

determining whether each of one or more files of data for a data processing request is cached or not, and if yes, executing data processing for each cached file to produce results in the local site, and if no, then, creating a file list of files, which are not cached, to be processed in the remote site;

sending the file list and a processing program for the data processing to the surrogate processing computer in the remote site;

determining whether or not the data processing is sufficiently effective to be done by the surrogate processing computer in the remote site considering an amount of the data transfer between the remote site and the local site; wherein the data processing is not sufficiently effective to be done by the surrogate processing computer in the remote site when the data processing takes more time to do in the remote site than in the local site due to the amount of the data transfer between the remote site and the local site;

if the data processing is sufficiently effective to be done by the surrogate processing computer in the remote site considering the amount of the data transfer between the remote site and the local site, then executing the data processing of the data in the surrogate processing computer and creating results of the data processing performed for data in the file list executed in the remote site; and if the data processing is not sufficiently effective to be done by the surrogate processing computer in the remote site due to the amount of the data transfer between the remote site and the local site, then creating an unprocessed file list of unprocessed data in the remote site and transmitting the unprocessed file list to the local site, and then executing data processing of data listed in the unprocessed file list in the local site, and merging the results of data processing performed in the local site with the results of data processing performed in the remote site and received from the remote site.

2. The method according to claim 1, wherein the surrogate processing computer includes a virtual machine monitor program emulating a virtual computer, the method further comprising:

creating a virtual machine image which includes the processing program and the file list of files to be processed in the remote site; and sending the virtual machine image including the file list and the processing program to the surrogate processing computer in the remote site.

3. The method according to claim 2, further comprising:

executing the virtual machine monitor program to boot a virtual machine in the surrogate processing computer to perform data processing of data in the file list in the remote site.

4. The method according to claim 2, wherein the virtual machine image is sent at a first time for a first data processing in the remote site, the method further comprising:

sending a differential part of the virtual machine image to the surrogate processing computer in the remote site, at a second time subsequent to the first time, for a second data processing in the remote site.

5. The method according to claim 1, wherein determining whether or not the data processing is sufficiently effective to be done by the surrogate processing computer in the remote site includes:

executing the data processing for a portion of the data in the file list by the surrogate processing computer in the remote site;

measuring a remote processing time for data processing of the portion of the data in the file list in the remote site; and judging whether it is faster to process a remaining portion of the data in the file list in the remote site than to process the remaining portion of the data in the file list in the local site based on local processing time for processing former data by the host computer in the local site, and if yes, then the data processing is sufficiently effective to be done by the surrogate processing computer in the remote site.

6. An information system comprising:

a local site which includes a cache file server coupled with a host computer; and a remote site which is disposed remotely from and coupled with the local site, and which includes a remote file server coupled with a surrogate processing computer;

wherein, for each file of one or more files of data for a data processing request which is cached, the host computer executes data processing for each cached file to produce results in the local site; and wherein, for each file of one or more files of data for the data processing request which is not cached, the host computer creates a file list of files, which are not cached, to be processed in the remote site, and sends the file list and a processing program for the data processing to the surrogate processing computer in the remote site;

wherein the surrogate processing computer is configured to determine whether or not the data processing is sufficiently effective to be done by the surrogate processing computer in the remote site considering an amount of the data transfer between the remote site and the local site;

wherein the data processing is not sufficiently effective to be done by the surrogate processing computer in the remote site when the data processing takes more time to do in the remote site than in the local site due to the amount of the data transfer between the remote site and the local site;

wherein, if the data processing is sufficiently effective to be done by the surrogate processing computer in the remote site considering an amount of the data transfer between the remote site and the local site, then the surrogate processing computer executes the data processing of the data and creates results of the data processing for data in the file list, and the host computer receives results of the data processing performed for data in the file list executed in the remote site;

wherein, if the data processing is not sufficiently effective to be done by the surrogate processing computer in the remote site due to the amount of the data transfer between the remote site and the local site, then the surrogate processing computer creates an unprocessed file list of unprocessed data and transmits the unprocessed file list to the local site, and the host computer receives the unprocessed file list of unprocessed data from the remote site and executes data processing of the data listed in the unprocessed file list in the local site and receives any results of the data processing for data in the file list already executed in the remote site; and wherein the host computer includes a process delegation module configured to merge the results of data processing performed in the local site with the results of data processing performed in the remote site and received from the remote site.

7. The information system according to claim 6, wherein the surrogate processing computer is configured to determine whether the data processing is sufficiently effective to be done by the surrogate processing computer in the remote site, and if yes, the surrogate processing computer executes the data processing for data in the file list and returns results of the data processing to the host computer, and if no, the surrogate processing computer returns the unprocessed file list of unprocessed data to the host computer for data processing of the unprocessed file list in the local site and returns any results of the data processing for data in the file list already executed in the remote site.

8. The information system according to claim 6,
wherein the surrogate processing computer includes a virtual machine monitor program emulating a virtual computer; and
wherein the host computer creates a virtual machine image which includes the processing program and the file list of files to be processed in the remote site, and sends the virtual machine image including the file list and the processing program to the surrogate processing computer in the remote site.

9. The information system according to claim 8,
wherein the surrogate processing computer executes the virtual machine monitoring program to boot a virtual machine in the surrogate processing computer to perform data processing of data in the file list in the remote site.

10. The information system according to claim 8,
wherein the host computers sends the virtual machine image to the surrogate processing computer at a first time for a first data processing in the remote site, and sends a differential part of the virtual machine image to the surrogate processing computer, at a second time subsequent to the first time, for a second data processing in the remote site.

11. The information system according to claim 8,
wherein the virtual machine image includes a surrogate program; and
wherein the surrogate processing computer runs the surrogate program to execute the received processing program for data processing of data in the file list in the remote site.

12. The information system according to claim 6, wherein determining whether or not the data processing is sufficiently effective to be done by the surrogate processing computer in the remote site includes:
    executing the data processing for a portion of the data in the file list by the surrogate processing computer in the remote site;
    measuring a remote processing time for data processing of the portion of the data in the file list in the remote site; and
    judging whether it is faster to process a remaining portion of the data in the file list in the remote site than to process the remaining portion of the data in the file list in the local site based on local processing time for processing former data by the host computer in the local site, and if yes, then the data processing is sufficiently effective to be done by the surrogate processing computer in the remote site.

13. A host computer in an information system which includes a local site having a cache file server coupled with a host computer; and a remote site which is disposed remotely from and coupled with the local site, and which includes a remote file server coupled with a surrogate processing computer;
the host computer comprising:
    a processor;
    a memory;
    a processing module;
    a sorting module;
    and a process delegation module;
    wherein, for each file of one or more files of data for a data processing request which is cached, the processing module is configured to execute data processing for each cached file to produce results in the local site; and
    wherein, for each file of one or more files of data for the data processing request which is not cached, the sorting module is configured to create a file list of files, which are not cached, to be processed in the remote site, and the process delegation module is configured to send the file list and a processing program for the data processing to the surrogate processing computer in the remote site;
    wherein, if the data processing is sufficiently effective to be done by the surrogate processing computer in the remote site considering, an amount of a data transfer between the remote site and the local site, then the process delegation module is configured to receive results of the data processing performed for data in the file list executed in the remote site by the surrogate processing computer to create the results of the data processing for data in the file list;
    wherein, if the data processing is not sufficiently effective to be done by the surrogate processing computer in the remote site due to the amount of the data transfer between the remote site and the local site, then the process delegation module is configured to receive an unprocessed file list of unprocessed data from the remote site which is created by the surrogate processing computer in the remote site and transmitted to the local site, and execute data processing of the data listed in the unprocessed file list in the local site and receive any results of the data processing for data in the file list already executed in the remote site;
    wherein the data processing is not sufficiently effective to be done by the surrogate processing computer in the remote site when the data processing takes more time to do in the remote site than in the local site due to the amount of the data transfer between the remote site and the local site; and
    wherein the process delegation module is configured to merge the results of data processing performed in the local site with the results of data processing performed in the remote site and received from the remote site.

14. The host computer according to claim 13,
wherein the process delegation program is configured to create a virtual machine image which includes the processing program and the file list of files to be processed in the remote site, and send the virtual machine image including the file list and the processing program to the surrogate processing computer in the remote site.

15. The host computer according to claim 14,
wherein the process delegation program is configured to send the virtual machine image to the surrogate processing computer at a first time for a first data processing in the remote site, and send a differential part of the virtual machine image to the surrogate processing computer, at a second time subsequent to the first time, for a second data processing in the remote site.

16. The host computer according to claim 14,
wherein the virtual machine image includes a surrogate program which is to be run by the surrogate processing computer to execute the received processing program for data processing of data in the file list in the remote site.

* * * * *